J. DARBY.
LAMP SOCKET.
APPLICATION FILED MAR. 12, 1910.
1,075,463.
Patented Oct. 14, 1913.
2 SHEETS—SHEET 1.
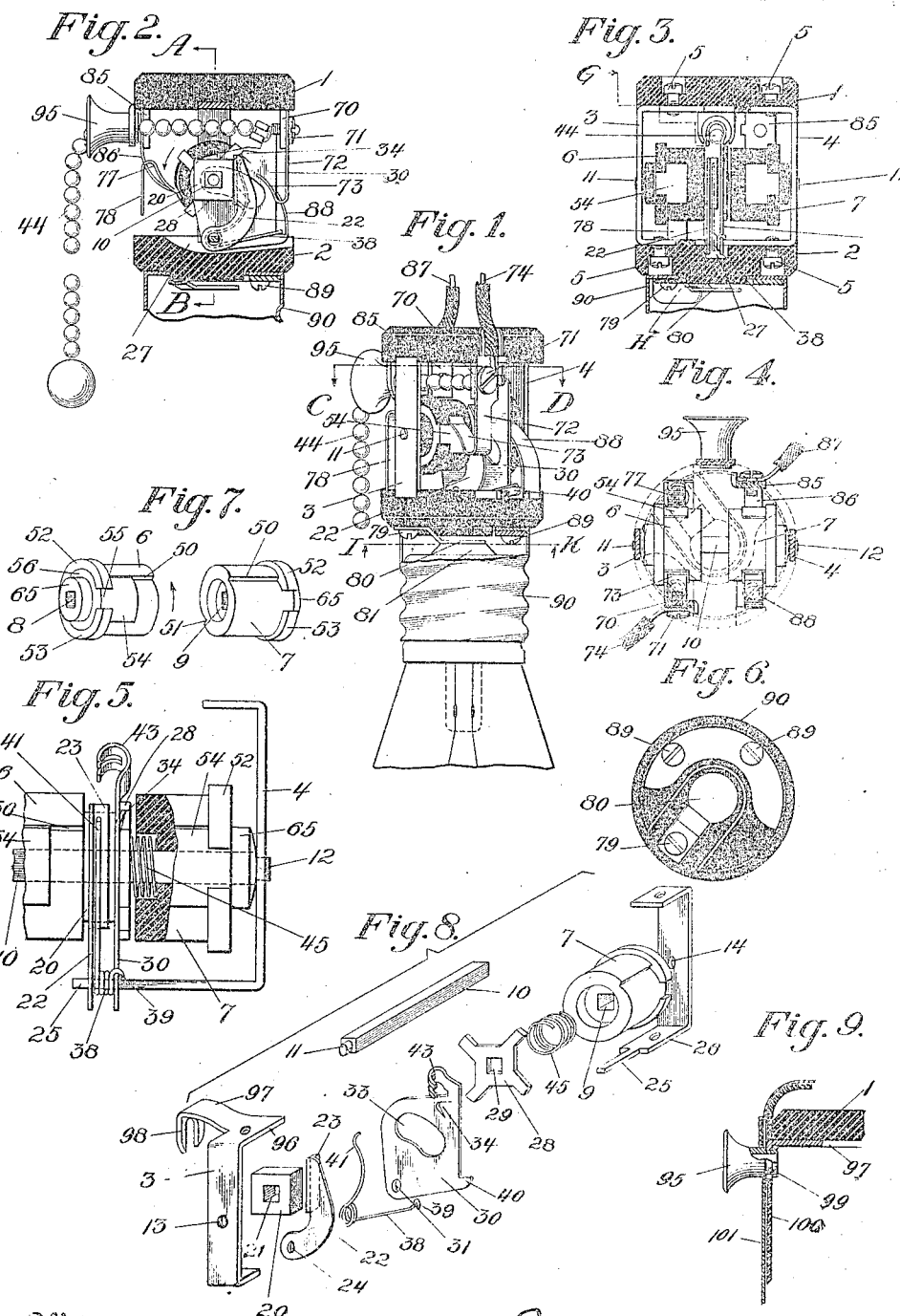
Witnesses:
Lenella F. Little
Rose Menk
John Darby, Inventor
By his Atty John D Morgan

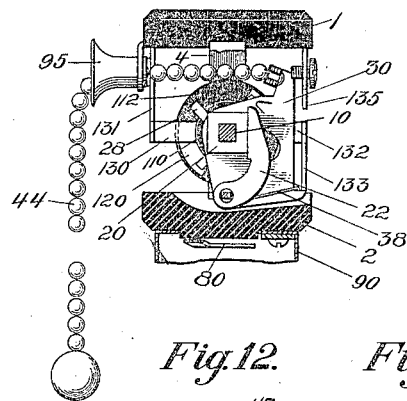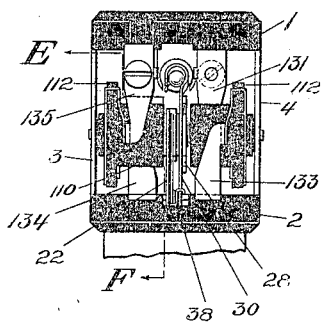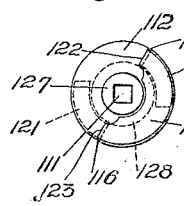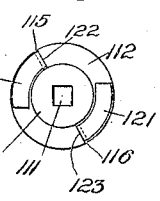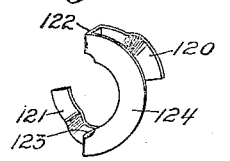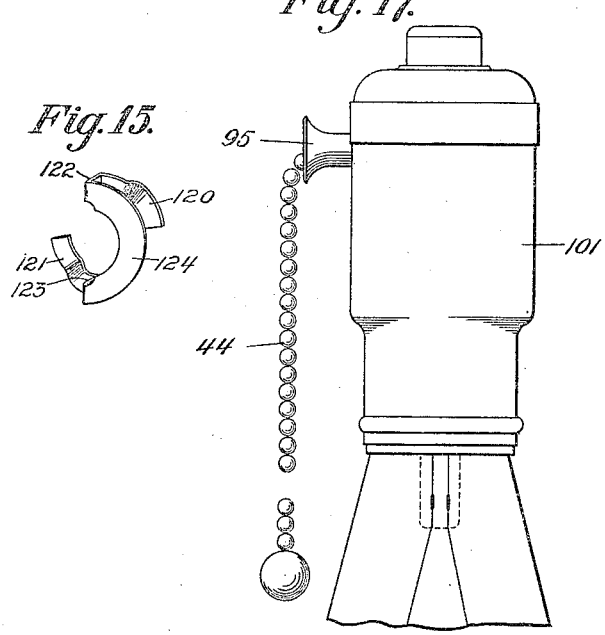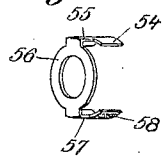

UNITED STATES PATENT OFFICE.

JOHN DARBY, OF SUMMIT, NEW JERSEY.

LAMP-SOCKET.

1,075,463.  Specification of Letters Patent.  Patented Oct. 14, 1913.

Application filed March 12, 1910. Serial No. 548,832.

*To all whom it may concern:*

Be it known that I, JOHN DARBY, a citizen of the United States, residing at Summit, in the county of Union and State of New Jersey, have invented new and useful Improvements in Lamp-Sockets, of which the following is a specification.

The invention relates to electric lamp sockets and in certain of its features more especially to sockets having a double pole and double break-circuit control although in certain of its features, the invention is applicable to other kinds of sockets.

The objects of the invention will in part appear hereinafter and will in part be obvious to those skilled in the art.

The invention consists in the novel parts, articles, constructions, arrangements, combinations and improvements herein shown and described.

The accompanying drawings referred to herein, and forming a part hereof, illustrate one embodiment of the invention, the same serving in connection with the description herein to explain the principles of the invention.

Of the drawings: Figure 1 is an elevation in perspective of a lamp socket embodying the principles of the invention; Fig. 2 is an elevation, with parts in section, on the line G—H of Fig. 3 looking in the direction of the arrows; Fig. 3 is an elevation with parts in section on a line corresponding to line A—B of Fig. 2; Fig. 4 is a transverse sectional view on the line C—D of Fig. 1, looking in the direction of the arrows, and with the actuating means for the controller omitted for sake of clearness in showing the other parts; Fig. 5 is a fragmentary elevation on an enlarged scale with parts in section, showing parts of the controller, the actuating mechanism therefor, and the mounting for the actuating mechanism; Fig. 6 is a bottom plan, with the screw shell in section, on the line I—K of Fig. 1; Fig. 7 shows two perspective views of the insulating cylinders of the controller; Fig. 8 is a perspective view showing on an enlarged scale the supporting standards for the socket heads, the shaft supported thereby and the controller actuating means and the right hand controller cylinder (the left hand cylinder being omitted for sake of clearness in showing the other parts;) Fig. 9 is a fragmentary sectional view on an enlarged scale showing the chain funnel and its mounting, and a portion of the outer shell; Fig. 10 is an elevation of a socket showing a different arrangement of the line and load contacts and of the conducting pieces on the controller; Fig. 11 is an elevation, partly in section, on the line E—F of Fig. 10; Fig. 12 is an end elevation of one of the controller cylinders; Fig. 13 is a front elevation corresponding to Fig. 12; Fig. 14 is an elevation looking at Fig. 13 from the right; Fig. 15 is a perspective detail of the commutator strip shown in Figs. 12—14; Fig. 16 is a perspective detail of the commutator strip as shown in Figs. 1, 2, 3, 4 and 5; Fig. 17 shows the complete and assembled socket.

Referring to the accompanying drawings, illustrating by way of example, one embodiment of the invention, a socket is shown having two opposed heads 1 and 2 of insulating material, having suitable supporting devices therebetween, such as the standards 3 and 4. These standards are shown having their ends angled and fitting into recesses in the heads 1 and 2, and fastened thereto by suitable screws 5, countersunk in the heads 1 and 2.

The controller is shown arranged transversely of the socket and arranged to make a break or a contact at two points in each branch of the circuit on successive actuations. The controller is shown having two cylinders, or parts 6 and 7 of insulating material and each of said parts carrying a conducting strip coöperating with two separated points in one branch of the circuit, the other conducting strip on the other of said parts coöperating with two separated points in the other branch of the circuit.

The controller is shown with central, non-cylindrical, and preferably square, apertures 8 and 9 which fit over a non-cylindrical squared, or otherwise correspondingly shaped shaft 10. This shaft has rounded ends 11 and 12 which are rotatably supported in apertures 13 and 14 in the standards 3 and 4.

Actuating means for the controller are provided and mounted between the parts 6 and 7 of the controller, is a detent piece 20, shown with four faces, and having a central aperture 21 fitting the shaft 10 on which the detent is carried. A detent lever 22 is shown with a bearing face 23 adapted to press against one face of the detent piece under suitable spring pressure. This detent piece is pivotally mounted, and for this purpose is provided with an aperture 24, which bears on the support 25 formed on the angled portion 26 of the standard 4. This angled portion 26 fits into a recess in the head 2 which is further recessed, as shown at 27 in Figs. 2 and 3, to afford play for the detent lever and also for the pawl lever, as will be hereinafter described.

A ratchet 28, having four teeth and provided with a central aperture 29 to fit the shaft 10 is also mounted between the controller members 6 and 7. A pawl piece 30 is mounted on the support 25, previously described, by means of the aperture 31. Said pawl piece 30 embraces the shaft 10, the elongated aperture 33, through which the shaft 10 passes, permitting a reciprocation of the pawl piece on its bearing. A tooth 34 is shown on the pawl piece on the side toward the ratchet 28 to engage one of its teeth to give a quarter turn to the controller. The top of the pawl piece 30 is shown hooked or curved over, and likewise bifurcated (as shown at 43 in Figs. 5 and 8) to receive the pull chain 44, as shown in Figs. 2 and 11.

For the purpose of pressing the detent lever to the detent piece and to return the pawl piece to starting position, a single spring may be used, and the spring 38 is shown carried on the support 25 between the detent lever and pawl piece (see Figs. 3, 5 and 8) and having the end 29 hooked over a catch 40 on the pawl piece and the end 41 bearing on the back of the bearing face 23 of the detent lever. In Fig. 5 the parts are shown assembled with the detent piece 20 next to the cylindrical controller member 6 on the shaft 10, the pawl piece 30 embracing the shaft 10 next to the detent piece, the ratchet 28 being next to the pawl piece 30 on the other side, the tooth 34 of the pawl piece projecting on that side to engage and actuate the ratchet. A spring 45 is shown conveniently coiled about the shaft 10 and nesting in a recess in the controlled member 7, said spring serving to yieldingly press the parts of the actuating mechanism together, also thereby causing the pawl tooth 34 to engage a tooth of the ratchet 28 in the forward movement and on the return movement to slide past and in behind the next tooth preparatory to the next forward movement.

When the chain 44 is pulled, the pawl piece 30 is rocked on its bearing 25, the forwardly pointing tooth 34 engaging one of the teeth of the ratchet 28, and thus beginning the rotation of the shaft 10 and the controller members 6 and 7. The rotation of the detent piece 20 forces the detent lever backwardly for about one eighth of a rotation, and this movement together with the movement of the pawl piece 30 in the opposite direction increases the tension on the spring 38. This increased tension serves to give a snapping, practically instantaneous movement to the controller during the latter half of its movement, after the corner of the detent piece has passed over the dead center. The conducting pieces on the controller are arranged to break with the contacts or terminals of the circuit just at the beginning of this quick movement, thus conducing to a non-arcing break. The detent then holds the controller firmly in the new position, while the pawl piece is carried back by the action of the spring 38, and as the tooth 34 of the pawl piece comes to the next tooth of the ratchet, the spring 45 will yield to permit a slight movement of the ratchet along the shaft 10 to permit the pawl piece tooth to pass the ratchet tooth, and as soon as it has passed, the spring 45 restores the ratchet to position in front of the tooth 34 ready for the next actuating movement.

The two parts or members 6 and 7 of the controller are of insulating material and are shown in Fig. 7 of a form representing in cross-section a double involute, each interrupted at a common diameter. This form will be clearly understood from an inspection of Fig. 7. In the surface of the cylinder there is a depression 50 substantially longitudinally of the cylinder, that is along an element of its surface, the surface then moving outwardly from the aperture 9 to the opposite depression 51. At the edge of the side and end of the said controller members are two projecting ridges 52 and 53, having interruptions between their ends substantially diametrically opposite each other. A hub 65 is also shown formed on the end of each of the members 6 and 7. The conducting strips are shown having a part 54 lying on the surface of the controller member with one edge lying against the edge 50 formed on the controller member. Connecting with the part 54 is a narrower part 55 which fits into the space between the ridges 52 and 53, is angled over the edge of the controller member, and which also connects to the ring portion 56 of the contact piece which fits snugly in the depression formed between the hub 65 and the ridges 52 and 53. From the ring 56 the corresponding opposite narrow part 57 connects with the opposite contact surface 58. The arrangement is such that in the rotation of the controller, the brush or contact piece rides directly onto the surface of the contact piece without striking its edge, thus giving a full and instantaneous contact at the start and preventing any arcing, the direction of rotation of the controller being indicated by the arrow in Fig. 7. At the breaking of the circuit, the brush snaps over the edge instantaneously, getting the same result of no arc at the break.

Coöperating with the conducting piece on the member 6 of the controller is a brush or contact 72 supported on a binding post 70 carried by the socket head 1, the binding screw 71 serving to connect the brush 72 with the line terminal 74. The contact 72 is turned or bent backwardly and also curved, as shown at 73 in Figs. 1 and 2, to have a full contact and a wiping action with the conducting strip of the controller. The corresponding contact or brush 78 going to a lamp terminal, is on the opposite side of the controller and coöperates with the same conducting strip on the controller. This contact piece connects by means of the screw 79 with the center contact 80 which makes contact with the lamp terminal 81 when the lamp is screwed into the socket. The contact piece 78 is bent backwardly at 77 in order to secure good contact with the conducting piece on the controller. A contact piece 86 which is connected to the other line terminal 87 is carried by a suitable supporting piece 85 from the socket head 1. This contact 86 coöperates with the conducting piece on the part 7 of the controller. Carried on the socket head 2, and coöperating with the same conducting piece is a contact 88, connecting through screws 89 with the screw shell 90 of the socket which connects to the other lamp terminal in a well known manner.

The chain funnel 95 is carried from one of the standards, and for this purpose the standard 3 is shown with its upper end angled at 96 and having an arm 97 extending outwardly to the edge of the socket. The socket head may be recessed to receive these parts. From the end of the arm 97 extends downwardly the bifurcated portion 98 into which portion the annular groove 99 of the funnel 95 is adapted to slip. In Fig. 9 these parts are shown with the insulating lining 100 and the outside socket shell 101 in position.

In Figs. 10 to 15 inclusive, a different construction and arrangement of the controller members and the conducting pieces carried thereby and also of the contacts coöperating therewith is shown. In Fig. 13 a controller member 110 is shown adapted to be mounted upon and to rotate with a supporting shaft in a suitable manner, as by means of the squared aperture 111. Each of said members has a disk 112 provided with two kerfs 115 and 116 extending therethrough substantially radially. Each of said controller members has a conducting strip thereon adapted to give a spring wiping action during the contact. Each conducting piece comprises two contacting surfaces 120 and 121 standing outwardly on one side of the disk 112. At their ends each of the contacts 120 and 121 connects with angled parts 122 and 123 lying in the kerfs 115 and 116. The parts 122 and 123 are connected by the plate 124 which lies on the other face of the disk 112. The controller member is shown provided with a hub 127 and a cylindrical portion 128, which in this instance serves merely to distance the parts.

The general connections for the contacts or brushes in the circuit may be substantially the same as hereinbefore described. In Fig. 11 a line contact 131 is shown carried by the socket head 1 and having the angled part 130 extending inwardly therefrom to coöperate with the part 120 of the conducting strip of the controller. A corresponding load contact 133 having an angled part 132 coöperating with the other part 121 of the conducting strip, and vice versa during successive actuations of the controller. Another set of contacts 134 and 135, connecting respectively with the line and load terminals in the other branch of the circuit are shown in Fig. 10 and need not be described in detail.

The invention is not limited to the exact constructions shown, but variations may be made in the construction within the scope of the accompanying claims.

What I do claim and desire to secure by Letters Patent, is:

1. A lamp socket including in combination opposed socket heads, a controller rotatably supported intermediately and transversely thereof, a conducting piece at one end of the controller, a conducting piece at the other end of the controller, circuit connections therefor, an actuating lever for the controller through which the controller support passes, said lever being located intermediately the ends of the controller and being pivoted at one side of said controller and extending past the controller, a fixed pawl on said lever, and a connection from the free end of said lever extending outside the socket.

2. A lamp socket including in combination two socket heads, a rotatable controller arranged intermediately and transversely thereof, a conducting piece at each end of the controller, a contact piece connected to one branch of the line circuit supported from one of said socket heads and a contact piece connected to a lamp terminal supported on the other socket head, the conducting piece at one end of the controller making and breaking the circuit between said two contact pieces, a contact piece connected to the other branch of the line circuit and supported from one of said socket heads, and a contact piece connected to the other lamp terminal and supported from the other socket head from the last-mentioned contact piece, the conducting piece at the other end of the controller making and breaking the circuit between said two last-mentioned contact pieces, an actuating lever for said controller mounted eccentrically of the controller, said lever traveling to and fro across the center of rotation of the controller.

3. A lamp socket including in combination a rotatable shaft, a ratchet rotating therewith and slidable along the shaft, a controller piece rotatable with said shaft, a lever mounted eccentrically to said controller and having a pawl engaging said ratchet, and means for allowing said ratchet to move along its shaft to permit the free passage of the pawl in one direction and to cause it to actuate the ratchet in the opposite direction.

4. A lamp socket including in combination a rotatable controller shaft, a controller rotatable with the shaft, a ratchet rotatable with and slidable along the shaft, a pawl mounted eccentrically of said shaft for actuating the ratchet when traveling in one direction, the ratchet sliding on the shaft when the pawl passes in the opposite direction.

5. A lamp socket including in combination a rotatable controller shaft, a controller rotatable with the shaft, a ratchet rotatable with the shaft and slidable thereon, a pawl carrying member pivoted eccentrically of said shaft through which the shaft passes, and a spring pressing the pawl member and ratchet together.

6. A lamp socket including in combination a rotatable controller shaft, a controller rotatable therewith, a ratchet rotatable with said shaft and slidable thereon, said ratchet being also slidable along said shaft, a detent upon said shaft, and a pawl carrying member mounted eccentrically to said shaft, the shaft passing through an aperture in said member, a single spring for returning said pawl carrying member and actuating said detent, and means for yieldingly pressing said ratchet and said member together.

7. A lamp socket including in combination a shaft, a controller rotatable therewith, a detent upon and rotatable with the shaft, a ratchet wheel rotatable with the shaft and slidable therealong, a pawl carrying member moving across said shaft and located between the detent and ratchet wheel and means for yieldingly pressing the ratchet toward the pawl carrying member.

8. A lamp socket including in combination a shaft, a controller member rotatable therewith, a detent rotatable with the shaft, a flat pawl carrying member embracing the shaft, a ratchet wheel rotatable with and slidable along said shaft, a spring pressing said ratchet wheel against said pawl carrying member, a second controller member, said other devices being located between said controller members.

9. A lamp socket including in combination two socket heads, a standard connecting said socket heads, a controller member, a standard, a detent lever and a pawl lever mounted on said bearing, and a single spring acting on both the detent lever and ratchet lever.

10. A lamp socket including in combination a rotatable controller, a ratchet rotatable therewith, a member pivotally mounted eccentrically to said controller and having a rigid pawl tooth engaging said ratchet at its side, and means for permitting said ratchet and pawl to yield relatively to each other on the return movement of the pawl.

11. A lamp socket including in combination a shaft, a controller thereon and rotatable therewith, a detent, and a ratchet wheel on said shaft and rotatable therewith, said ratchet wheel being also movable along the shaft, a lever embracing said shaft and having a rigid pawl piece engaging the ratchet wheel, and a spring acting on said ratchet wheel in the direction of the shaft.

12. A lamp socket including in combination a shaft, a controller piece at either end thereof, a detent and a ratchet wheel on the shaft intermediate the controller pieces, said ratchet being slidable on said shaft, a member carrying a rigid pawl tooth, embracing said shaft adjacent to said ratchet wheel, and a spring acting on said ratchet wheel along said shaft.

13. A lamp socket including in combination a rotatable shaft, a controller piece at each end thereof rotatable therewith, a detent on said shaft rotatable therewith, a ratchet wheel rotatable with and also slidable along said shaft, a pawl carrying member embracing said shaft beside the ratchet wheel, and a spring urging the ratchet wheel toward the pawl carrying member, said detent, ratchet wheel, and pawl carrying member being located between said controller pieces.

14. A lamp socket including in combination a rotatable shaft, a controller piece at each end thereof rotatable therewith, a detent on said shaft rotatable therewith, a ratchet wheel rotatable with and also slidable along said shaft, a pawl carrying member embracing said shaft beside the ratchet wheel, and a spring urging the ratchet wheel toward the pawl carrying member, said spring being nested within one of said controller members.

In testimony whereof, I have signed my name to this specification in the presence of two subscribing witnesses.

JOHN DARBY.

Witnesses:
　JOHN D. MORGAN,
　ROSE MENK.